US012719956B2

(12) United States Patent
Kahn et al.

(10) Patent No.: US 12,719,956 B2
(45) Date of Patent: Aug. 25, 2026

(54) APPLICATION SPECIFIC PROTOCOL DATA UNIT SESSIONS

(71) Applicant: NOKIA TECHNOLOGIES OY, Espoo (FI)

(72) Inventors: Colin Kahn, Morris Plains, NJ (US); Devaki Chandramouli, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/697,376

(22) PCT Filed: Sep. 30, 2021

(86) PCT No.: PCT/US2021/052807
§ 371 (c)(1),
(2) Date: Mar. 29, 2024

(87) PCT Pub. No.: WO2023/055368
PCT Pub. Date: Apr. 6, 2023

(65) Prior Publication Data

US 2024/0396975 A1 Nov. 28, 2024

(51) Int. Cl.
*H04L 67/141* (2022.01)
*H04L 47/2491* (2022.01)
*H04L 67/30* (2022.01)

(52) U.S. Cl.
CPC ........ *H04L 67/141* (2013.01); *H04L 47/2491* (2013.01); *H04L 67/30* (2013.01)

(58) Field of Classification Search
CPC .... H04L 67/141; H04L 67/30; H04L 47/2491
See application file for complete search history.

(56) References Cited

U.S. PATENT DOCUMENTS 10,856,265 B2 12/2020 Ryu
2018/0367288 A1 12/2018 Vrzic et al.
(Continued)

FOREIGN PATENT DOCUMENTS

KR 20210054419 A 5/2021
WO 2018/129665 A1 7/2018
WO 2019/160546 A1 8/2019

OTHER PUBLICATIONS

International Search Report and Written Opinion dated Jan. 11, 2022 corresponding to International Patent Application No. PCT/US2021/052807.

(Continued)

*Primary Examiner* — Joshua D Taylor
(74) *Attorney, Agent, or Firm* — Robert P. Michal, Esq.; Rimon PC

(57) ABSTRACT

Systems, methods, apparatuses, and computer program products for initiating or providing application specific protocol data unit (PDU) sessions are provided. One method may include receiving, from an application server or application function having a co-located or integrated micro-user plane function (UPF), a request to use the micro-user plane function (UPF) for an application. The method may include, based on information included in the request, determining an application specific data network name (AS-DNN) and provisioning a session management node with the micro-user plane function (UPF) information associated with the application specific data network name (AS-DNN).

1 Claim, 5 Drawing Sheets

(56) References Cited

U.S. PATENT DOCUMENTS

2019/0037636 A1 1/2019 Kim et al.
2020/0106812 A1* 4/2020 Verma ................. H04W 12/088
2020/0259896 A1 8/2020 Sachs et al.
2020/0359295 A1* 11/2020 Huang-Fu ............. H04W 80/10
2021/0058748 A1 2/2021 Liao
2021/0105196 A1 4/2021 Dao et al.
2021/0176613 A1 6/2021 Purkayastha et al.
2021/0235542 A1* 7/2021 Li ......................... H04M 15/00

OTHER PUBLICATIONS

3GPP TS 23.548 V17.0.0 (Sep. 2021), Technical Specification, 3rd Generation Partnership Project; Technical Specification Group Services and System Aspects; 5G System Enhancements for Edge Computing; Stage 2 (Release 17), Sep. 2021.
3GPP TS 23.502 V17.2.0 (Sep. 2021), Technical Specification, 3rd Generation Partnership Project; Technical Specification Group Services and System Aspects; Procedures for the 5G System (5GS); Stage 2 (Release 17), Sep. 2021.
"3rd Generation Partnership Project; Technical Specification Group Services and System Aspects; System architecture for the 5G System (5GS); Stage 2 (Release 17)", 3GPP TS 23.501 V17.1.1, Jun. 2021, pp. 1-526.
"IEEE Standard for Local and Metropolitan Area Networks- Bridges and Bridged Networks", IEEE Computer Society, IEEE Std 802.1Q™-2018, May 7, 2018, 1993 pages.
"3rd Generation Partnership Project; Technical Specification Group Services and System Aspects; Policy and charging control framework for the 5G System (5GS); Stage 2 (Release 17)", 3GPP TS 23.503, V17.1.0, Jun. 2021, pp. 1-137.
"New Services & Application with 5G Ultra Reliable Law Latency Communications", 5G Americas, Nov. 2018, pp. 1-60.
Office action received for corresponding Indian Patent Application No. 202447034043, dated May 8, 2026, 7 pages.

* cited by examiner

430 Receiving information on a micro-UPF and AS-DNN

435 Receiving a request for PDU session establishment indicating an AS-DNN

440 Selecting the micro-UPF as PSA based on the AS-DNN in the received information 15
10
14
Memory
12
Processor
18
Transceiver 71
35
30
34
Memory
32
Processor
38
Transceiver 70
25
20
24
Memory
22
Processor
28
Transceiver

72

APPLICATION SPECIFIC PROTOCOL DATA UNIT SESSIONS

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing application specific protocol data unit (PDU) sessions.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus that includes at least one processor and at least one memory comprising computer program code. The at least one memory and computer program code configured, with the at least one processor, to cause the apparatus at least to receive, from an application server having a co-located or integrated micro-user plane function (UPF), a request to use the micro-user plane function (UPF) for an application, to determine an application specific data network name (AS-DNN) based on information included in the request, and to provision a session management node with the micro-user plane function (UPF) information associated with the application specific data network name (AS-DNN).

An embodiment may be directed to an apparatus that includes at least one processor and at least one memory comprising computer program code. The at least one memory and computer program code configured, with the at least one processor, to cause the apparatus at least to receive, from a network node, information for a micro-user plane function (UPF) and an application specific data network name (AS-DNN) associated with the micro-user plane function, to receive, from a user equipment, a request for protocol data unit (PDU) session establishment indicating the application specific data network name (AS-DNN), and to select the micro-user plane function (UPF) as a protocol data unit (PDU) session anchor (PSA) based on the application specific data network name (AS-DNN) in the information received from the network node.

An embodiment may be directed to an apparatus that includes at least one processor and at least one memory comprising computer program code. The at least one memory and computer program code configured, with the at least one processor, to cause the apparatus at least to receive a user equipment policy that indicates use of an application specific data network name (AS-DNN) for traffic indicated by a traffic description, and to transmit, to a network node, a request for protocol data unit (PDU) session establishment, wherein the protocol data unit (PDU) session establishment request indicates the application specific data network name (AS-DNN). The application specific data network name (AS-DNN) is used for a micro-user plane function (UPF) selection for the indicated traffic by a core network node.

An embodiment may be directed to an apparatus that includes at least one processor and at least one memory comprising computer program code. The at least one memory and computer program code configured, with the at least one processor, to cause the apparatus at least to transmit a request to a $5^{th}$ generation network node to use a micro-user plane function (UPF) for an application. The request comprises at least one of a traffic description indicating traffic for which micro-user plane function (UPF) is to be used, an application server associated micro-user plane function (UPF) identifier (ID), an application identifier (ID) for the application, or micro-user plane function (UPF) information. The apparatus may comprise an application server having a co-located or integrated micro-user plane function (UPF).

An embodiment may be directed to a method including receiving, from an application server having a co-located or integrated micro-user plane function (UPF), a request to use the micro-user plane function (UPF) for an application. The method may also include, based on information included in the request, determining an application specific data network name (AS-DNN), and provisioning a session management node with the micro-user plane function (UPF) information associated with the application specific data network name (AS-DNN).

An embodiment may be directed to a method including receiving, from a network node, information for a micro-user plane function (UPF) and an application specific data network name (AS-DNN) associated with the micro-user plane function, and receiving, from a user equipment, a request for protocol data unit (PDU) session establishment indicating the application specific data network name (AS-DNN). The method may also include selecting the micro-user plane function (UPF) as a protocol data unit (PDU) session anchor (PSA) based on the application specific data network name (AS-DNN) in the information received from the network node.

An embodiment may be directed to a method including receiving a user equipment policy that indicates use of an application specific data network name (AS-DNN) for traffic indicated by a traffic description, and transmitting, to a network node, a request for protocol data unit (PDU) session establishment. The protocol data unit (PDU) session establishment request indicates the application specific data network name (AS-DNN). The application specific data network name (AS-DNN) is used for a micro-user plane function (UPF) selection for the indicated traffic by a core network node.

An embodiment may be directed to a method including transmitting, by a network entity, a request to a 5th generation network node to use a micro-user plane function (UPF) for an application. The request comprises at least one of a traffic description indicating traffic for which micro-user plane function (UPF) is to be used, an application server associated micro-user plane function (UPF) identifier (ID), an application identifier (ID) for the application, or micro-user plane function (UPF) information. The network entity may comprise an application server having a co-located or integrated micro-user plane function (UPF).

An embodiment may be directed to an apparatus including means for receiving, from an application server having a co-located or integrated micro-user plane function (UPF), a request to use the micro-user plane function (UPF) for an application. Based on information included in the request, the apparatus may include means for determining an application specific data network name (AS-DNN), and means for provisioning a session management node with the micro-user plane function (UPF) information associated with the application specific data network name (AS-DNN).

An embodiment may be directed to an apparatus including means for receiving, from a network node, information for a micro-user plane function (UPF) and an application specific data network name (AS-DNN) associated with the micro-user plane function. The apparatus may also include means for receiving, from a user equipment, a request for protocol data unit (PDU) session establishment indicating the application specific data network name (AS-DNN), and means for selecting the micro-user plane function (UPF) as a protocol data unit (PDU) session anchor (PSA) based on the application specific data network name (AS-DNN) in the information received from the network node.

An embodiment may be directed to an apparatus including means for receiving a user equipment policy that indicates use of an application specific data network name (AS-DNN) for traffic indicated by a traffic description, and means for transmitting, to a network node, a request for protocol data unit (PDU) session establishment. The protocol data unit (PDU) session establishment request indicates the application specific data network name (AS-DNN), and the application specific data network name (AS-DNN) may be used for a micro-user plane function (UPF) selection for the indicated traffic by a core network node.

An embodiment may be directed to an apparatus including means for transmitting a request to a $5^{th}$ generation network node to use a micro-user plane function (UPF) for an application. The request comprises at least one of a traffic description indicating traffic for which micro-user plane function (UPF) is to be used, an application server associated micro-user plane function (UPF) identifier (ID), an application identifier (ID) for the application, or micro-user plane function (UPF) information. The apparatus may comprise an application server having a co-located or integrated micro-user plane function (UPF).

BRIEF DESCRIPTION OF THE DRAWINGS

For proper understanding of example embodiments, reference should be made to the accompanying drawings, wherein.

DETAILED DESCRIPTION

Figure 1:
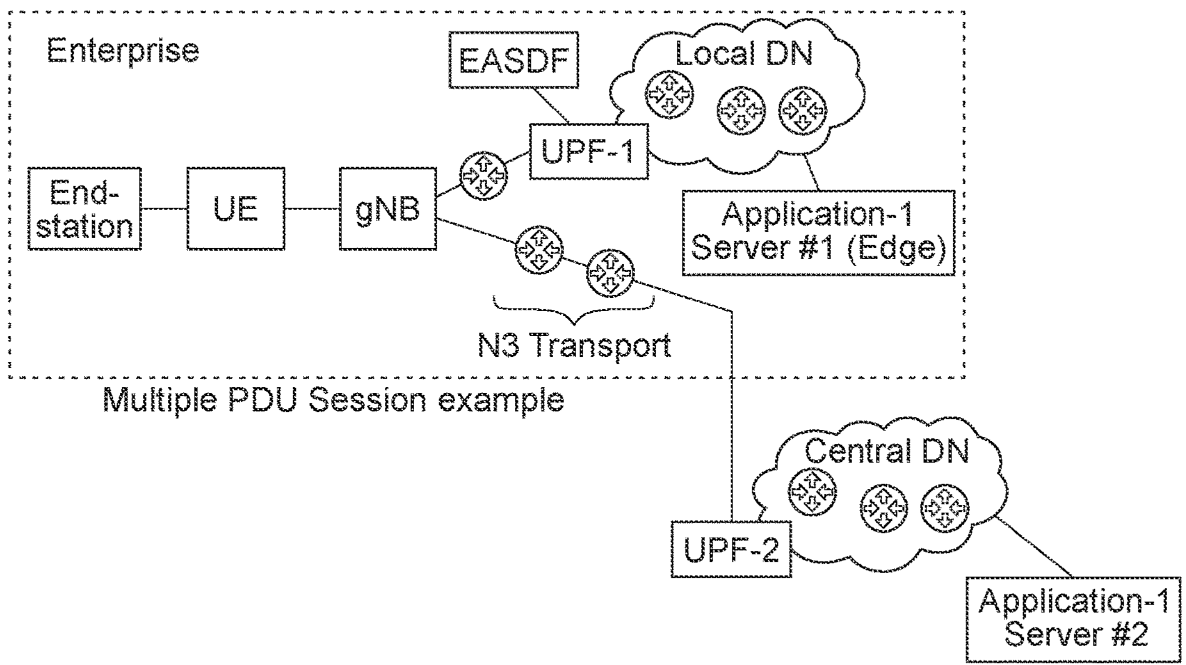
FIG. 1 illustrates an example edge computing topology.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing application specific PDU sessions, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

One of the purposes of the 5G system (5GS) is to provide connectivity between a UE and a data network (DN) identified by a data network name (DNN) where applications may reside. The system provides connectivity between a UE and any application reachable via the DN. The DN may be the "internet" or a private network (e.g., an enterprise network or a factory network), which may further provide connectivity to applications in the internet via a gateway. Connectivity is provided via protocol data unit (PDU) sessions, which associate the UE with a DN. A PDU session terminates at a PDU session anchor (PSA), which for 5G resides in a user plane function (UPF). Traffic is normally sent in the user plane between the UE and the PSA UPF and the PSA UPF provides further connectivity to the DN. PDU sessions may be of type "ethernet", "IP", or "unstructured" according to the type of DN to which connectivity is established.

When the UE needs to setup connectivity to a DN, it sends a PDU Session Establishment request to the 5GS (e.g., see 3GPP technical specification (TS) 23.502, clause 4.3.2). The message may contain the requested network slice(s) (Single Network Slice Selection Assistance Information—S-NSSAI) and requested DNN among other parameters. The S-NSSAI specifies the slice/service type indicating the expected behavior of the 5GS in terms of features (e.g., URLLC, MIOT), and optionally differentiates between multiple network slices of the same type (e.g., for different enterprises). The request to establish a PDU session is sent to the session management function (SMF) that selects the PSA UPF by considering UPF deployment scenarios, such as a centrally located UPF and a distributed UPF located close to or at the access network site.

It is noted that the architecture for 4G, 3G and 2G may be similar. In 4G, packet data network (PDN) connections are used in place of PDU Sessions. The DN is known as a PDN, which is represented by an access point name (APN) rather than a DNN. In 3G and 2G, packet data protocol (PDP) contexts are used and the Gateway GPRS Support Node (GGSN) (rather than a UPF or PGW) is selected to anchor the session.

Enhancements to the 5GS have extended the model described above of providing a UE with connectivity to a DN. In 3GPP Release-16, the 5GS time sensitive networking (TSN) bridge was defined as an element within an Ethernet DN. The 5GS TSN bridge was defined with a granularity of "per-UPF", meaning each UPF represented a separate IEEE bridge. To external IEEE management systems, the 5GS TSN bridge appears as any other (i.e., wired) TSN bridge, supporting IEEE 802.1Q protocols (particularly 802.1Qcc. 802.1Qbv, and 802.1Qci). However, internal to the 5GS, there is still a transport network for F1-U and/or N3 that is separate from the TSN network, and UPF selection by the SMF remains unchanged. A DNN/S-NSSAI combination may be used by the SMF to select a UPF hosting a specific 5GS TSN bridge, thereby preserving the construct of connecting the UE to a DN.

Enhancements for edge computing in 3GPP Release-17 can also affect PSA selection. FIG. 1 illustrates an example edge computing topology. For edge computing, the 5G core network (5GC) selects a UPF close to the UE point of attachment and forwards traffic to the local DN via a N6 interface according to traffic steering rules. For instance, in the example of FIG. 1, the 5GC may select UPF-1 and forward the traffic to the local DN. An application service may be supplied by multiple application servers that may be deployed in different sites (e.g., central and local) and/or in different DNs, such as Server #1 and Server #2 depicted in the example of FIG. 1. The 5GC may (re) select the PSA UPF to route the user traffic to the closest application server according to the location/mobility of the UE. This reduces end-to-end latency and load on the transport network. The process whereby the application server changes and/or the PSA UPF is relocated is known as edge relocation (e.g., see 3GPP TS 23.548).

The 5GS is designed to provide connectivity to any application on a DN, not to specific applications deployed locally. Historically, this has worked well for 3GPP networks. For 2G, 3G and early 4G, typically a handful of anchor points (GGSN/PGW) were deployed by operators (sometimes one per-country). Traffic was routed to the centrally located session anchor by the 4G/3G/2G networks where metering, traffic policing, charging, lawful intercept (LI) and other functions were performed by communication service providers (CSPs) prior to routing packets to/from the DN (e.g., the internet). This required (and still requires for 5G) two network segments between endpoints—the 3GPP network and the DN. This adequately supports multi-function devices (e.g., smart phones) that can access any application available on the DN.

However, for other scenarios, this leads to several problems. When local 5G connectivity with specific quality of service (QOS) and reliability requirements (e.g., URLLC) is needed between identifiable endpoints, e.g., a mobile robot and fixed controller for industrial IoT (IIoT), there is no need for two network segments-both the DN and the 5GS, to provide connectivity. It is noted that the 5GS may contain a wired network on one or both of F1-U (which connects the NG-RAN DU(s) with the NG-RAN-CU(s), and N3 (which connects the NG-RAN with a UPF-see FIG. 1). Having two network segments means interworking between the 5GS with DN protocols is required, which can become quite complex as is the case in 3GPP Release-16 where the 5GS was integrated as a TSN bridge in an IEEE TSN network. It also makes it more complex to operate and manage the end-to-end connectivity since both 5GS management and DN management is required. Furthermore, features used to optimize one segment (e.g., IEEE TSN for the DN) are generally not available in the other network segment (i.e., the 5GS, including Uu and the transport networks on F1-U and N3). Also, 5GS capabilities, such as charging and LI that are more easily implemented with centralized anchors are not relevant for most local connectivity use cases.

When both endpoints are in the same location (e.g., a factory production cell or the same room in an enterprise), the trend to virtualized RAN (V-RAN) and virtualized UPF can mean circuitous transport of traffic to an enterprise data center where a local UPF and/or V-RAN is instantiated. This can lead to multiple, unnecessary network hops. For example, hops may have to be performed from a factory production cell where a robot (UE) resides to the enterprise data center (over N3/F1-U) where the UPF and/or V-RAN (e.g., CU-U) is located, and back again to the production cell via the enterprise DN where a local controller resides. Similar scenarios may apply for virtual reality (VR)/extended reality (XR). This may particularly apply in the classic edge computing scenario where a UPF PSA is selected for connecting to a local DN or a centralized DN as shown in FIG. 1.

Additionally, having two network segments (the 5GS and the DN) introduces an unnecessary additional attack surface. Any malicious application that can access the DN can affect service between the two endpoints.

Certain example embodiments discussed herein can address and overcome at least the problems discussed above, for instance, by eliminating the DN and providing connectivity between a UE and an application using just the 5GS.

Figure 2:
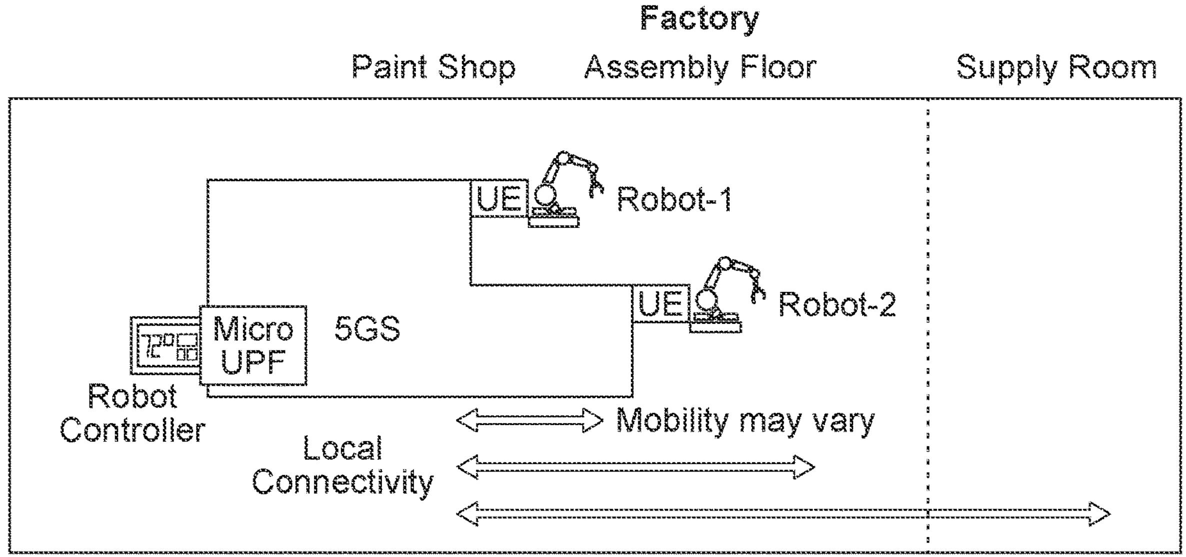
FIG. 2 illustrates an example system diagram of one example embodiment.

FIG. 2 illustrates an example system diagram of one embodiment as applied to a factory environment. More specifically, FIG. 2 illustrates connectivity to a fixed application server via a co-located or integrated micro-UPF. According to certain embodiments, the DN for 5GS connectivity between an application server and a mobile endpoint can be eliminated via the introduction of micro-UPF PSAs that are co-located or integrated with fixed endpoint application servers, as depicted in the example of FIG. 2. Furthermore, an example embodiment introduces the ability for the application function (AF) to install the micro-UPF PSA giving the application the ability to influence its own PSA anchor to be leveraged. Some embodiments may be applicable for cases where connectivity is needed between UEs and specific applications.

Figure 3:
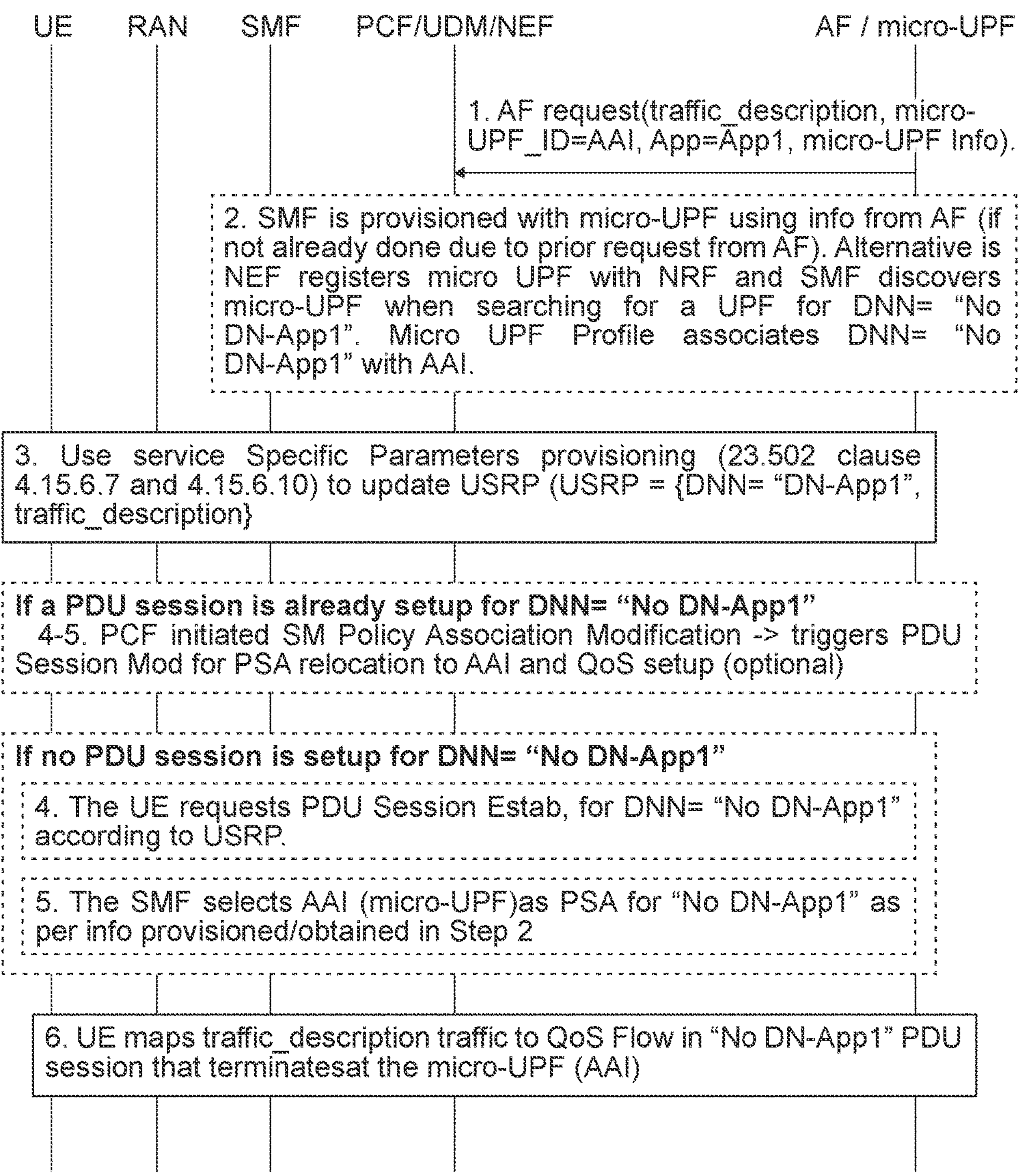
FIG. 3 illustrates an example of a signaling diagram, according to an embodiment.

FIG. 3 illustrates an example of a signaling diagram, according to an embodiment. As illustrated in the example of FIG. 3, at 1, an application (AF) for which a micro-UPF is co-located/integrated with the application server may transmit, to the 5GS, a request to use the micro-UPF for the application. According to certain embodiments, the request from the AF may specify one or more of: a traffic description indicating the traffic for which the micro-UPF is to be used, an application server associated micro-UPF ID, an application ID, and/or micro-UPF information.

As further illustrated in the example of FIG. 3, at 2, the 5GS, such as the policy control function (PCF)/network exposure function (NEF), unified data management node (UDM) or SMF, may determine an application specific DNN (AS-DNN) based on the AF provided information (e.g., the Application ID). In the example of FIG. 3, the AS-DNN="DN-App1" is assigned based on the AF provided "App1" application ID, and the Application server associated micro-UPF ID="AS1" (Application Server 1). It is noted that there is no actual DN corresponding to the AS-DNN. The AS-DNN is used for micro-UPF selection as described below.

In the example of FIG. 3, at 3, SMF provisioning of the "micro-UPF information" provided by the AF and the AS-DNN is performed. According to certain embodiments, this provisioning may be done by sending the information that results from the AF request, to the SMF (possibly via the NEF and/or UDM), or by using the information to formulate a micro-UPF profile that is sent to the NRF. The SMF may then discover the micro-UPF via the NRF.

In certain embodiments, the UE may be provisioned with a UE route selection policy (URSP) that indicates use of the AS-DNN for the traffic description indicated by the AF. It is noted that the URSP may be used by the UE to decide if a PDU session establishment request is required for the indicated traffic. As illustrated in the example of FIG. 3, at 320, if no PDU session has been setup, the UE may specify the DNN (i.e., the AS-DNN) in its request. In the example of FIG. 3, the AS-DNN is "No DN-App1" so the UE requests PDU session establishment for DNN="No DN-App1" according to the provisioned USRP. When the SMF receives a request from a UE indicating DNN="No DN-App1", the SMF may select the micro-UPF according to the information it has obtained in procedure 3 outlined above. In the example of FIG. 3, the SMF may select AS1 (micro-UPF) as PSA when theDNN="No DN-App1" as indicated by the UE.

Alternatively or in addition, as illustrated at 310 in the example of FIG. 3, if a PDU session has already been setup for the AS-DNN when the 5GS receives an AF request, the 5GS may update the SMF provisioning of the micro-UPF. The 5GS may also initiate a PDU session modification to relocate the PSA according to the micro-UPF ID sent in the AF request. This process allows a new micro-UPF ID and new micro-UPF information to be associated with an application. Hence, if there is more than one application server for an application where both application servers have co-located/integrated micro-UPFs, the PSA can be moved to the new application server/micro-UPF, for example, due to UE mobility. As further illustrated in the example of FIG. 3, at 6, the UE may map the traffic indicated by the traffic description to a QoS flow in the AS-DNN (No-DN-App1) PDU session that terminates at the micro-UPF (AS1).

It is noted that certain embodiments do not require that all traffic from an endpoint be sent to the application server specific micro-UPF. Traffic not matching the AF provided traffic description can be sent via a separate PDU session with a PSA that provides connectivity to a DN as is normally done. For example, a robot may need to exchange operations, administration and maintenance (OA&M) information or receive software updates from a management server that resides on a DN. This may be done via a normal PDU session that provides a connection to the DN, while URLLC traffic for the designated applications may be sent via a separate PDU session with a PSA at the application server integrated/co-located micro-UPF.

Some example embodiments may be realized with UPF network interface cards (NICs) for fixed endpoints and UE NICs for mobile endpoints.

Figures 4A, 4B:
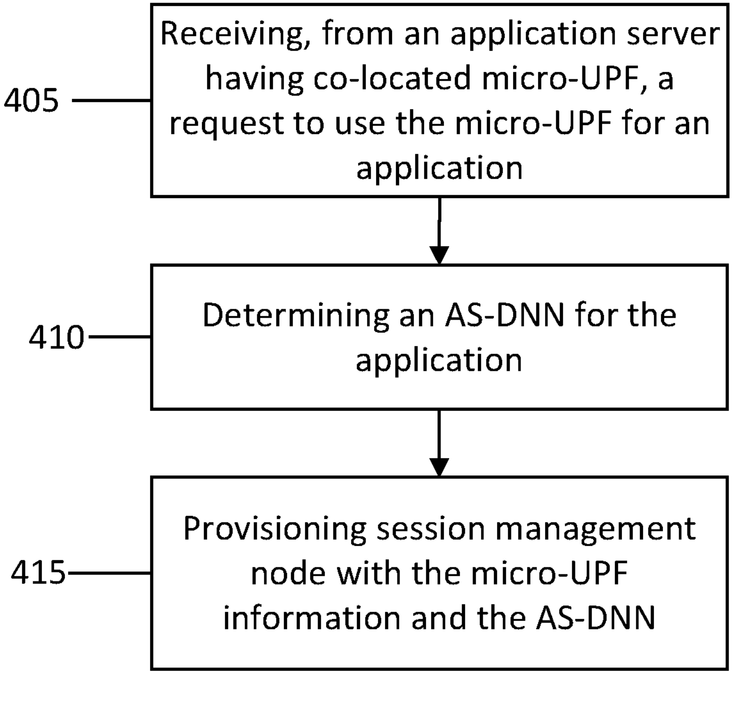
FIG. 4A illustrates an example flow diagram of a method, according to an embodiment.
FIG. 4B illustrates an example flow diagram of a method, according to an embodiment.

FIG. 4A illustrates an example flow diagram of a method for initiating or providing application specific PDU sessions, according to one embodiment. In certain example embodiments, the flow diagram of FIG. 4A may be performed by a network entity or network node in a communications system, such as LTE or 5G NR. In some example embodiments, the network entity performing the method of FIG. 4A may include or be included in a base station, access node, node B, eNB, gNB, gNB-DU, gNB-CU, NG-RAN node, transmission-reception points (TRPs), high altitude platform stations (HAPS), relay station or the like. In further example embodiments, the network entity performing the method of FIG. 4A may include or be included in a 5G core (5GC) network node, or 5GC network functions, or the like. For example, according to certain embodiments, the entity performing the method of FIG. 4A may include a policy control node (e.g., PCF), network exposure node (e.g., NEF), unified data management node (e.g., UDM) and/or session management node (e.g., SMF), such as those illustrated in the examples of FIGS. 1-3, or any other entity or network function. In some embodiments, the method of FIG. 4A may illustrate example operations of a PCF, NEF, UDM or SMF, which may correspond to apparatus 10 as illustrated in, and described with respect to, FIG. 5A discussed below.

As illustrated in the example of FIG. 4A, the method may include, at 405, receiving, from an application server or AF having a co-located or integrated micro-UPF, a request to use the micro-UPF for an application. In an embodiment, the method may include, at 410, based on information included in the request, determining an AS-DNN. According to certain embodiments, the information in the request may include one or more of: a traffic description indicating traffic for which micro-UPF is to be used, an application server associated micro-UPF ID, an application ID for the application, and/or micro-UPF information.

As further illustrated in the example of FIG. 4A, the method may include, at 415, provisioning a session management node (e.g., the SMF) with the micro-UPF information associated with the AS-DNN. In some embodiments, the provisioning 415 may include transmitting the information included in the request received at 405 and the determined AS-DNN to the session management node (e.g., SMF), and/or the provisioning 415 may include formulating a micro-UPF profile based on the information included in the request and sending the micro-UPF profile to a network repository (e.g., NRF) for discovery by the session management node (e.g., the SMF). In an embodiment, the determined AS-DNN may be used for micro-UPF selection by the session management node.

According to an embodiment, when a PDU session has already been setup for the AS-DNN when the request is received at 405, the method may include updating the session management node (e.g., SMF) provisioning of the micro-UPF, and/or initiating a PDU session modification to relocate the PSA according to the micro-UPF ID sent in the request received at 405 from the application server or AF. This process allows a new micro-UPF ID and new micro-UPF information to be associated with an application. Thus, when there is more than one application server for an application where both application servers have co-located or integrated micro-UPFs, the PSA can be moved to the new application server/micro-UPF, for example, due to UE mobility. According to a further embodiment, when a PDU session has already been setup for the AS-DNN when the request is received at 405, the provisioning 415 may include updating the provisioning of the session management node (e.g., SMF) with the micro-UPF, and initiating a PDU session modification to relocate the PSA according to the micro-UPF identified by an ID provided in the request.

According to some embodiments, the method may include provisioning a UE with a UE policy, such as a URSP, that indicates use of the AS-DNN for the traffic description indicated by the application server or AF in the request received at 405. In an embodiment, the URSP may be used by the UE to decide whether a PDU session establishment request is required for the indicated traffic.

FIG. 4B illustrates an example flow diagram of a method for initiating or providing application specific PDU sessions, according to one embodiment. In certain example embodiments, the flow diagram of FIG. 4B may be performed by a network entity or network node in a communications system, such as LTE or 5G NR. In some example embodiments, the network entity performing the method of FIG. 4B may include or be included in a base station, access node, node B, cNB, gNB, gNB-DU, gNB-CU, NG-RAN node, transmission-reception points (TRPs), high altitude platform stations (HAPS), relay station, or 5GC network entities or functions, or the like. For example, according to certain embodiments, the entity performing the method of FIG. 4B may include a session management node or SMF, such as those illustrated in the examples of FIGS. 1-3, or any other entity or network function. In some embodiments, the method of FIG. 4B may illustrate example operations of a SMF that may correspond to apparatus 20 as illustrated in, and described with respect to, FIG. 5B discussed below.

As illustrated in the example of FIG. 4B, the method may include, at 430, receiving information for a micro-UPF and an AS-DNN associated with the micro-UPF. For example, the information on the micro-UPF and/or AS-DNN may be received from a network node, such as a 5GS node, policy control node (e.g., PCF), a Unified Data Management node (e.g., UDM) and/or network exposure node (e.g., NEF). In an embodiment, the method may include, at 435, receiving, from a UE, a request for PDU session establishment indicating the AS-DNN. According to an embodiment, the method may also include, at 440, selecting the micro-UPF as a PSA based on the AS-DNN in the information received from the network node at 430. In one embodiment, the receiving 435 may include discovering a profile of the micro-UPF from a network repository.

Figure 4C:
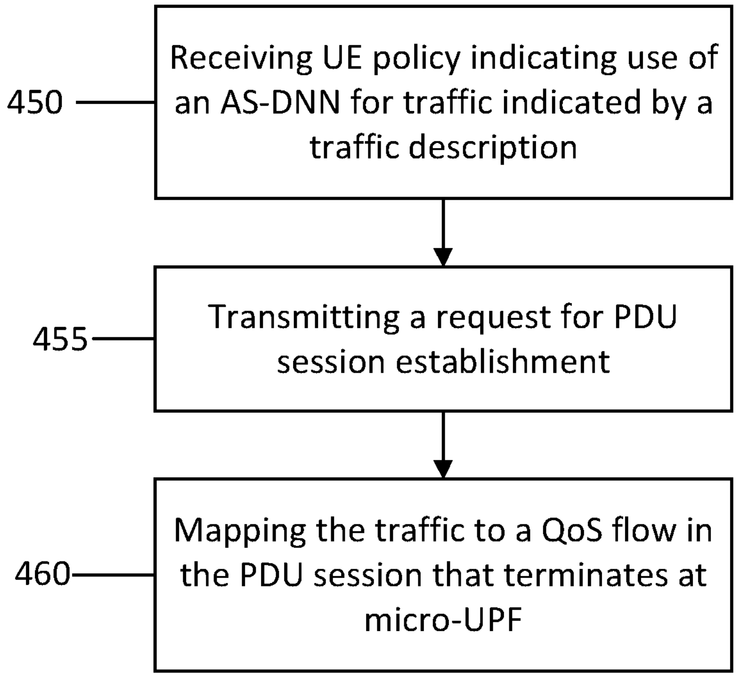
FIG. 4C illustrates an example flow diagram of a method, according to an embodiment.

FIG. 4C illustrates an example flow diagram of a method of initiating or providing application specific PDU sessions, according to an example embodiment. In certain example embodiments, the flow diagram of FIG. 4C may be performed by a communication device in a communications system, such as LTE or 5G NR. For instance, in some example embodiments, the communication device performing the method of FIG. 4C may include a UE, sidelink (SL) UE, wireless device, mobile station, IoT device. UE type of roadside unit (RSU), other mobile or stationary device, or the like. For example, according to certain embodiments, the entity performing the method of FIG. 4C may include a UE, such as those illustrated in the examples of FIGS. 1-3, or any other entity discussed herein. In some embodiments, the method of FIG. 4C may illustrate example operations of a UE that may correspond to apparatus 30 as illustrated in, and described with respect to, FIG. 5C discussed below.

As illustrated in the example of FIG. 4C, the method may include, 450, receiving a UE policy, such as a URSP, that indicates use of an AS-DNN for traffic indicated by a traffic description. In one embodiment, the method may include determining, based on the UE policy (e.g., URSP), whether a protocol data unit (PDU) session establishment request is required for the indicated traffic. According to some embodiments, the method of FIG. 4C may include, at 455, transmitting a request for PDU session establishment to a network node, such as a session management node or SMF. In certain embodiments, the PDU session establishment request may indicate the AS-DNN. According to an embodiment, the AS-DNN may be used for a micro-UPF selection for the indicated traffic by a core network node. As further illustrated in the example of FIG. 4C, in some embodiments, the method may include, at 460, mapping the traffic to a QoS flow in the PDU session that terminates at the micro-UPF. In an embodiment, the method may further include transmitting traffic or data over the PDU session to the micro-UPF.

Figures 5A, 5B, 5C:
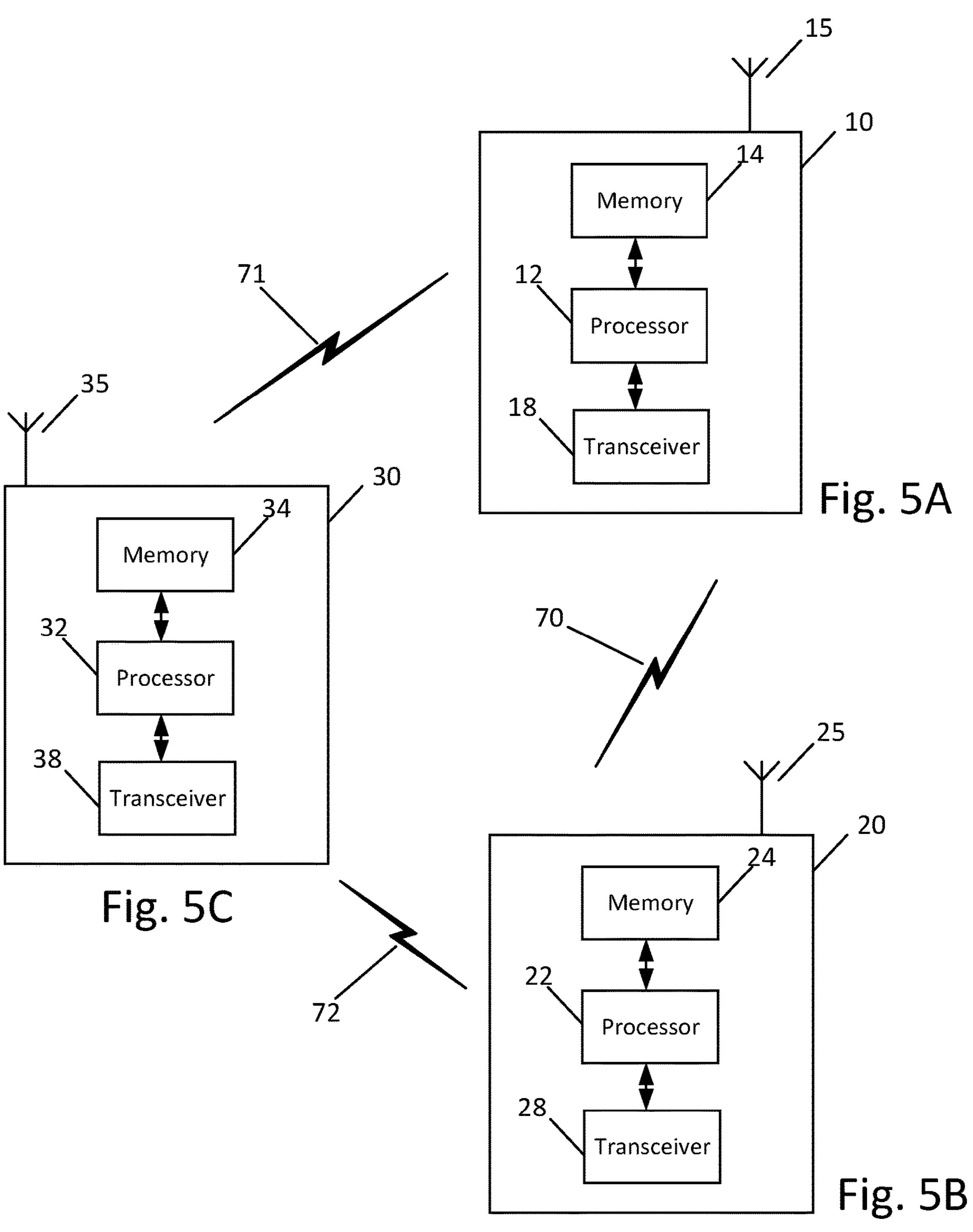
FIG. 5A illustrates an example block diagram of an apparatus, according to an embodiment.
FIG. 5B illustrates an example block diagram of an apparatus, according to an embodiment.
FIG. 5C illustrates an example block diagram of an apparatus, according to an embodiment.

FIG. 5A illustrates an example of an apparatus 10 according to an embodiment. In an embodiment, apparatus 10 may be a node, host, or server in a communications network or serving such a network. For example, apparatus 10 may be or may be included in a satellite, base station, a Node B, an evolved Node B (eNB), 5G Node B or access point, next generation Node B (NG-NB or gNB), transmission receive point (TRP), high altitude platform station (HAPS), integrated access and backhaul (IAB) node, and/or WLAN access point, associated with a radio access network, such as a LTE network, 5G or NR. In one example embodiment, apparatus 10 may represent a PCF and/or NEF, such as those illustrated in FIGS. 1-3.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5A.

As illustrated in the example of FIG. 5A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples.

While a single processor 12 is shown in FIG. 5A, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc. USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and/or receive information. The transceiver 18 may include, for example, a plurality of radio interfaces that may be coupled to the antenna(s) 15, or may include any other appropriate transceiving means. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (e.g., digital-to-analog converters and the like), mappers, a Fast Fourier Transform (FFT) module, and/or the like, e.g., to generate symbols or signals for transmission via one or more downlinks and to receive symbols (e.g., via an uplink).

As such, transceiver 18 may be configured to modulate information on to a carrier waveform for transmission by the antenna(s) 15 and to demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input device and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, TRP, HAPS, IAB node, WLAN access point, or the like. In some example embodiments, apparatus 10 may be or may be included in a PCF and/or NEF. For example, in some embodiments, apparatus 10 may be configured to perform one or more of the processes depicted in any of the flow charts or signaling diagrams described herein, such as those illustrated in any of FIGS. 1-4. In some embodiments, as discussed herein, apparatus 10 may be configured to perform a procedure relating to initiating or providing application specific PDU sessions, for example.

FIG. 5B illustrates an example of an apparatus 20 according to another embodiment. In an embodiment, apparatus 20 may be a node or element in a communications network or associated with such a network, such as a satellite, base station, a Node B, an evolved Node B (eNB), 5G Node B or access point, next generation Node B (NG-NB or gNB), transmission receive point (TRP), high altitude platform station (HAPS), integrated access and backhaul (IAB) node, and/or WLAN access point, associated with a radio access network, such as a LTE network, 5G or NR. In one example embodiment, apparatus 20 may represent a SMF or AF, such as those illustrated in FIGS. 1-3.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 5B.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR. 5G, WLAN, WiFi, NB-IoT, Bluetooth, NFC. MulteFire, and/or any other radio access technologies. It should be noted that one of ordinary skill in the art would understand that apparatus 20 may include components or features not shown in FIG. 5B.

As illustrated in the example of FIG. 5B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some embodiments, apparatus 20 may be an AF, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-4. Thus, according to an embodiment, apparatus 20 may be configured to perform a procedure relating to initiating or providing application specific PDU sessions, as discussed elsewhere herein.

FIG. 5C illustrates an example of an apparatus 30 according to another example embodiment. In an example embodiment, apparatus 30 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 30 may be implemented in, for instance, a wireless handheld device, a wireless plug-in accessory, or the like. It should be noted that one of ordinary skill in the art would understand that apparatus 30 may include components or features not shown in FIG. 5C.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 5C.

As illustrated in the example of FIG. 5C, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 5C, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a UE, communication node, mobile equipment (ME), mobile station, mobile device, stationary device, IoT device, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein, such as those illustrated in FIGS. 1-4. According to certain example embodiments, apparatus 30 may be configured to perform a procedure relating to initiating or providing application specific PDU sessions, for instance.

In some example embodiments, an apparatus (e.g., apparatus 10, apparatus 20, and/or apparatus 30) may include means for performing a method, a process, or any of the variants discussed herein. Examples of the means may include one or more processors, memory, controllers, transmitters, receivers, sensors, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. For example, as discussed in detail above, certain example embodiments are configured to provide methods and/or systems to provide application specific PDU sessions. For example, certain embodiments can eliminate the DN for 5GS connectivity between an application server and a mobile endpoint or UE by introducing micro-UPF PSAs that are co-located or integrated with fixed endpoint application servers. Thus, some example embodiments can be leveraged for use cases such as public safety, IIoT, military 5G for complete isolation of traffic and full control of traffic within the network to provide full security. Additionally, some embodiments can be leveraged for UE-UE communication when local routing is preferred for a specific application. In addition, example embodiments can be configured to be applicable for edge or centrally located UPFs. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:

at least one processor; and at least one memory comprising computer program code, the at least one memory and computer program code configured, with the at least one processor, to cause the apparatus at least to perform:

receiving, from an application server having a co-located or integrated micro-user plane function (UPF), a request to use the micro-user plane function (UPF) for an application, wherein the information in the request comprises:

a traffic description indicating traffic for which micro-user plane function (UPF) is to be used;

an application server associated micro-user plane function (UPF) identifier (ID);

an application identifier (ID) for the application; and micro-user plane function (UPF) information;

based on information included in the request, determining an application specific data network name (AS-DNN);

provisioning a session management node with the micro-user plane function (UPF) information associated with the application specific data network name (AS-DNN), wherein the determined application specific data network name (AS-DNN) is used for micro-UPF selection by the session management node, wherein the provisioning of the session management node comprises:

transmitting the information included in the request and the determined application specific data network name (AS-DNN) to the session management node; and formulating a micro-user plane function (UPF) profile based on the information included in the request and sending the micro-user plane function (UPF) profile to a network repository for discovery by the session management node;

provisioning to a user equipment, that does not have a user equipment route selection policy (URSP), a URSP that indicates use of the application specific data network name (AS-DNN) for the traffic description indicated by the application server in the request; and when a protocol data unit (PDU) session has already been setup for the application specific data network name (AS-DNN) when the request is received, updating the provisioning of the session management node with the micro-user plane function (UPF), and initiating a PDU session modification to relocate the PDU session anchor (PSA) according to the micro-user plane function (UPF) identified by an identifier (ID) provided in the request.

* * * * *